United States Patent
Watarai et al.

(10) Patent No.: US 7,170,202 B2
(45) Date of Patent: Jan. 30, 2007

(54) LINEAR MOTOR

(75) Inventors: Akira Watarai, Tokyo (JP); Kouki Naka, Tokyo (JP); Kazumasa Itou, Tokyo (JP); Masaya Inoue, Tokyo (JP); Michio Nakamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 328 days.

(21) Appl. No.: 10/505,780

(22) PCT Filed: Apr. 11, 2003

(86) PCT No.: PCT/JP03/04640

§ 371 (c)(1),
(2), (4) Date: Aug. 26, 2004

(87) PCT Pub. No.: WO2004/093301

PCT Pub. Date: Oct. 28, 2004

(65) Prior Publication Data

US 2005/0173991 A1    Aug. 11, 2005

(51) Int. Cl.
H02K 41/00 (2006.01)
H02K 41/02 (2006.01)

(52) U.S. Cl. .................... 310/12; 310/154.01
(58) Field of Classification Search .............. 310/12, 310/154.01, 179, 154.32, 154.08, 269
See application file for complete search history.

(56) References Cited

U.S. PATENT DOCUMENTS 3,894,275 A * 7/1975 Baumans et al. ............. 318/38
4,424,463 A * 1/1984 Musil ...................... 310/49 R
4,475,051 A    10/1984 Chai et al.
4,672,253 A * 6/1987 Tajima et al. ............... 310/269
5,910,691 A * 6/1999 Wavre ......................... 310/12

FOREIGN PATENT DOCUMENTS

| JP | 64-077460 A | 3/1989 |
| JP | 09-191629 A | 7/1997 |
| JP | 2000-278931 A | 10/2000 |
| JP | 2002-034230 A | 1/2002 |
| JP | 2002-119040 A | 4/2002 |

* cited by examiner

*Primary Examiner*—Darren Schuberg
*Assistant Examiner*—Erik Preston
(74) *Attorney, Agent, or Firm*—Sughrue Mion, PLLC

(57) ABSTRACT

In a linear motor according to this invention, the field permanent magnets 2 are arranged at an equal pitch around a field iron core 1 so that the poles are alternately changed. Also, an armature 3a on the needle side is arranged oppositely via a magnetic gap on a magnetic pole face of the field permanent magnets 2. The armature 3a consists of an armature core forming the teeth and a yoke portion by punching an electromagnetic steel plate like the comb teeth, coil being wound around a plurality of teeth 4u, 4v and 4w for this armature core to form the armature windings 5u, 5v and 5w. The teeth 6a without coil winding is disposed between teeth with coil winding 4u and 4v and between teeth with coil winding 4v and 4w. The teeth 4u, 4v and 4w with coil winding and the teeth 6a without coil winding are alternately arranged.

12 Claims, 4 Drawing Sheets

LINEAR MOTOR

TECHNICAL FIELD

The present invention relates to a linear motor employed for an actuator or conveying equipment such as a table feeder for tooling machine.

BACKGROUND ART

The linear motor comprises a field magnetic pole and an armature facing the field magnetic pole, one of them being employed as a stator, and the other as a needle. A moving coil linear motor has the field magnetic pole as stator and the armature as needle, and a moving magnet linear motor has the field magnetic pole as needle and the armature as stator.

In patent document 1 (JP-A-2000-278931), a moving coil linear motor was disclosed in which to suppress a cogging thrust produced in the linear motor, the armature is divided into a plurality of blocks, with a phase difference provided between divided blocks of the armature, whereby the produced cogging thrust is offset between armature blocks.

In the patent document 1, to provide the linear motor with the suppressed cogging thrust, shorter length of armature in the thrust direction and higher coil temperature detecting precision, the armature is divided into a plurality of armature blocks that are arranged in the thrust direction, in which a block core of each armature block has the teeth arranged at an equal pitch, the number of teeth being an integral multiple of the number of phases, the teeth being provided with an armature coil with concentrated winding, and the armature coil of each armature block is shifted in phase by an electrical angle corresponding to an interval between armature blocks to provide a phase difference in the cogging torque caused in each armature block, the cogging torque being offset to null the sum of cogging torque.

The linear motor as described in patent document 1 is constituted to suppress the produced cogging torque, with a structure in which all the teeth of the armature has the winding, the windings of different phases being adjacent within each slot, and to enhance the insulation of the motor, there is a need for providing the measures for reinforcing the insulating material such as a coil film or interlayer paper or decreasing the amount of coil within the slot to keep a distance between the coils within the slot, as described above. A method for enhancing the insulation of the motor by reinforcing the insulating material such as coil film or interlayer paper had a problem that, because the insulating material such as coil film or interlayer paper is varied in the degree of deterioration due to constituents of the cutting water, the insulating material is difficult to select, and the material cost and the number of manufacturing steps are increased.

Also, another method for enhancing the insulation of the motor by decreasing the amount of coil within the slot to keep a distance between the coils within the slot had a problem that the motor performance is sacrificed, because the motor has more field ohmic loss due to the decreased amount of coil.

Also, another method for enhancing the insulation of the motor had a problem that the whole motor may be covered with resin to prevent intrusion of the substance that deteriorates the insulation, but when the resin is damaged by biting chips, the cutting water possibly intrudes through a damaged portion to deteriorate the insulation.

This invention has been achieved to solve the above-mentioned problems, and it is an object of the invention to provide a linear motor in which the produced cogging thrust is suppressed, and the insulation of the motor is enhanced simply.

DISCLOSURE OF THE INVENTION

The present invention provides a linear motor having the field magnetic poles having the permanent magnets arranged at an equal pitch, and an armature facing the field magnetic poles, characterized in that an armature core of the armature is provided with the teeth arranged at an equal pitch and an armature coil with concentrated winding around every other teeth, wherein the number of magnetic poles with the permanent magnets and the number of teeth in the armature core are in a combination of 5n to 6n−1 (n: natural number), and the interval of teeth in the armature core is $5\tau/6 \pm \tau/6$ for the magnetic pole pitch $\tau$, whereby the productivity is increased and the phase-to-phase insulation is enhanced.

Also, when the length of motor is changed to obtain a predetermined thrust, the armature core for every six teeth can be altered, whereby the length of motor is easily changed in accordance with the mechanical dimension.

Also, the invention provides a linear motor having the field magnetic poles having the permanent magnets arranged at an equal pitch, and an armature facing the field magnetic poles, characterized in that an armature core of the armature is provided with the teeth arranged at an equal pitch and an armature coil with concentrated winding around every other teeth, wherein the number of magnetic poles with the permanent magnets and the number of teeth in the armature core are in a combination of 5n to 6n+1 (n: natural number), and the interval of teeth in the armature core is $5\tau/6 \pm \tau/6$ for the magnetic pole pitch $\tau$, whereby it is possible to avoid a direct impact on the windings owing to the teeth without coil winding disposed on both sides of the armature, even when the motor collides at the stroke end while the linear motor is running, whereby the linear motor has a higher reliability.

Also, the invention provides a linear motor having the field magnetic poles having the permanent magnets arranged at an equal pitch, and an armature facing the field magnetic poles, characterized in that an armature core of the armature is provided with the teeth arranged at an equal pitch and an armature coil with concentrated winding around every other teeth, wherein the number of magnetic poles with the permanent magnets and the number of teeth in the armature core are in a combination of 7n to 6n−1 (n: natural number), and the interval of teeth in the armature core is $7\tau/6 \pm \tau/6$ for the magnetic pole pitch $\tau$, whereby the productivity is increased and the phase-to-phase insulation is enhanced.

Also, when the length of motor is changed to obtain a predetermined thrust, the armature core for every six teeth can be altered, whereby the length of motor is easily changed in accordance with the mechanical dimension.

Also, the invention provides a linear motor having the field magnetic poles having the permanent magnets arranged at an equal pitch, and an armature facing the field magnetic poles, characterized in that an armature core of the armature is provided with the teeth arranged at an equal pitch and an armature coil with concentrated winding around every other teeth, wherein the number of magnetic poles with the permanent magnets and the number of teeth in the armature core are in a combination of 7n to 6n+1 (n: natural number), and the interval of teeth in the armature core is $7\tau/6 \pm \tau/6$ for the magnetic pole pitch $\tau$, whereby it is possible to avoid a direct impact on the windings owing to the teeth without coil winding disposed on both sides of the armature, even when the motor collides at the stroke end while the linear motor is running, whereby the linear motor has a higher reliability.

Further, since the teeth without armature coil winding located on both sides of the armature may be different in the shape and pitch from the other teeth, the mechanical dimension is easily adjusted.

Moreover, since of the teeth arranged at an equal pitch in the armature core, the teeth without armature coil winding has a smaller width than the teeth with armature coil winding, the thrust characteristic is improved.

BEST MODE FOR CARRYING OUT THE INVENTION

Embodiment 1

Figure 1:
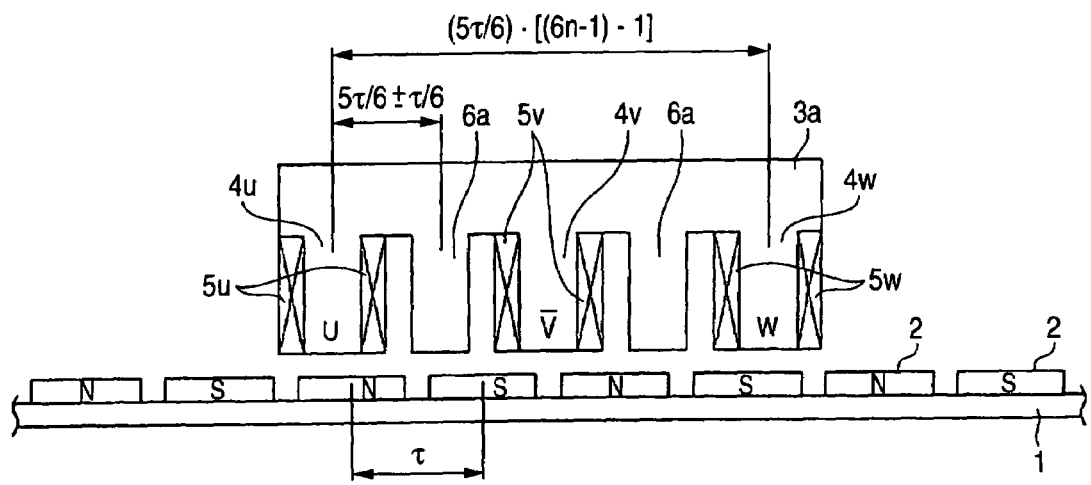
FIG. 1 is a view showing the structure of a linear motor according to an embodiment 1 of the present invention.

Referring to FIG. 1, the structure of a linear motor according to an embodiment 1 of this invention will be described below. FIG. 1 shows a moving coil type linear motor, in which the field permanent magnets 2 are arranged at an equal pitch around a field iron core 1 on the stator (field magnetic pole) side so that the poles are alternately changed. Also, an armature 3a on the needle side is arranged oppositely via a magnetic gap on a magnetic pole face of the field permanent magnets 2 provided on the stator side. The armature 3a consists of an armature core forming the teeth and a yoke portion by punching an electromagnetic steel plate like the comb teeth, coil being wound around a plurality of teeth 4u, 4v and 4w of this armature core to form the armature windings 5u, 5v and 5w.

In FIG. 1, coil is wound around the teeth 4u, 4v and 4w of the armature 3a to form the armature windings 5u, 5v and 5w. The teeth 6a without coil winding is disposed between teeth 4u and 4v and between teeth 4v and 4w. The teeth 4u, 4v and 4w with coil winding and the teeth 6a without coil winding are alternately arranged.

The linear motor according to the embodiment 1 has a combination of the number of magnetic poles in the field magnetic poles with permanent magnets and the number of teeth for the armature as 5n to 6n−1 (n: natural number that is a factor for deciding the number of teeth), in which the interval between teeth for the armature is 5τ/6±τ/6 for the magnetic pole pitch τ of the field magnetic poles, and the armature windings are arranged in the order of forward winding, reverse winding, and forward winding, and in the phase order of U phase, V phase and W phase, for every other teeth from the end teeth on the left side of FIG. 1. Also, a case with n=1 is shown in FIG. 1.

By the way, in the above description, the armature windings are arranged in the order of forward winding, reverse winding, and forward winding, and in the phase order of U phase, V phase and W phase, for every other teeth from the end teeth on the left side of FIG. 1. However, the armature windings may be arranged in the order of reverse winding, forward winding and reverse winding, and in the phase order of U phase, V phase and W phase.

Also, the phase order is the U phase, V phase and W phase in the above description, but may be the V phase, W phase and U phase, or W phase, U phase and V phase, or W phase, V phase and U phase, or V phase, U phase and W phase, or U phase, W phase and V phase.

Conventionally, the coil was wound around all the teeth. However, in the linear motor according to the embodiment 1, the teeth 4u, 4v and 4w with coil winding and the teeth 6a without coil winding are alternately arranged, and among the five teeth composing the armature three teeth have the coil winding, as shown in FIG. 1, whereby the productivity is increased. Also, the coils forming the armature windings 5u, 5v and 5w are disposed via the teeth 6a, and not adjacent with other coils, whereby the phase-to-phase insulation is increased.

Also, when the length of motor is changed to obtain a predetermined thrust, it can be changed for every six teeth in the linear motor according to the embodiment 1. Thereby, the length of motor is easily changed based on the mechanical size.

Embodiment 2

Figure 2:
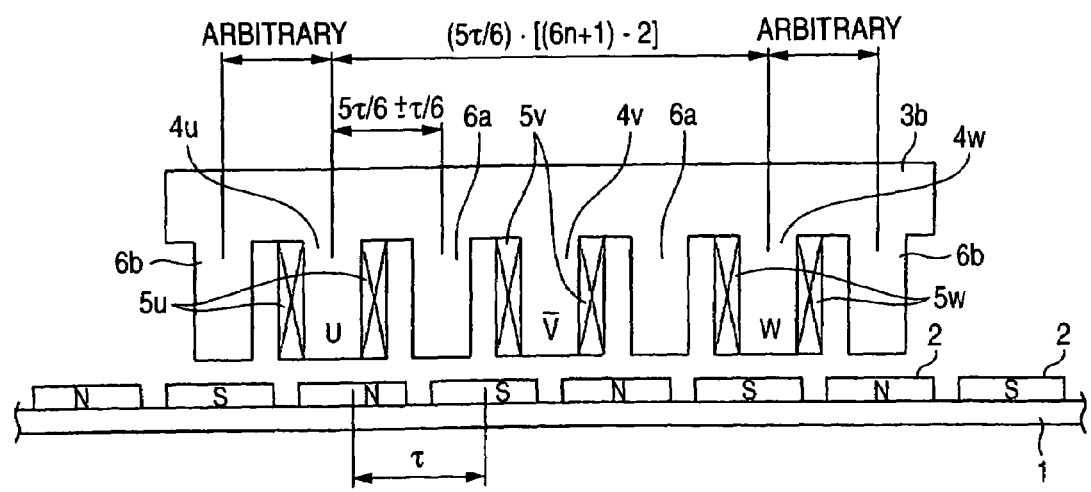
FIG. 2 is a view showing the structure of a linear motor according to an embodiment 2 of the invention.

Referring to FIG. 2, the structure of a linear motor according to an embodiment 2 of this invention will be described below. In FIG. 2, the parts with reference numerals 1, 2, 4u, 4v, 4w, 5u, 5v, 5w and 6a are the same as in FIG. 1, and are not described here.

Coil is wound around the teeth 4u, 4v and 4w of an armature 3b to form the armature windings 5u, 5v and 5w. Also, the teeth 6a has no coil winding. The teeth with coil winding 4u, 4v and 4w and the teeth 6a without coil winding are alternately arranged Also, the teeth 6b without coil winding are formed on both sides of the armature 3b, and has an arbitrary shape and pitch.

The linear motor according to the embodiment 2 has a combination of the number of magnetic poles in the field magnetic poles with permanent magnets and the number of teeth for the armature as 5n to 6n+1 (n: natural number that is a factor for deciding the number of teeth). The interval between teeth for the armature except for the teeth 6b at both ends is 5τ/6±τ/6 for the magnetic pole pitch τ of the field magnetic poles. Also, the armature windings are arranged in the order of forward winding, reverse winding, and forward winding, and in the phase order of U phase, V phase and W phase for every other teeth beginning with the second teeth (teeth 2u in FIG. 2) from the end teeth 6b on the left side of FIG. 2. Also, a case with n=1 is shown in FIG. 2.

The armature 3b in the linear motor according to the embodiment 2 has a structure in which the teeth 6b without coil winding are added on both sides of the armature 3a in the linear motor according to the embodiment 1.

The same effects of the embodiment 1 are obtained. Since the teeth 6b without coil winding are arranged on both sides of the armature 3b, it is possible to avoid a direct impact on the windings, even when the motor collides at the stroke end while the linear motor is running, whereby the linear motor has a higher reliability.

Figure 3:
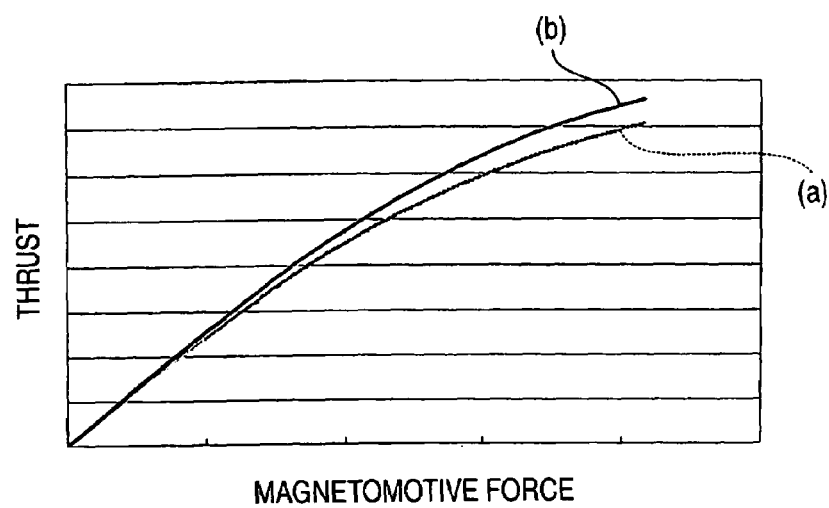
FIG. 3 is a graph showing the thrust characteristics of the linear motor.

As shown in FIG. 3, the thrust (FIG. 3A) of the linear motor having the structure of FIG. 2 is greater than the thrust (FIG. 3B) of the linear motor having the structure of FIG. 1.

By the way, in the above description, the case that the armature windings are arranged in the order of forward winding, reverse winding, and forward winding, and in the phase order of U phase, V phase and W phase, for every other teeth beginning with the second teeth (teeth 4u in FIG. 2) from the end teeth 6b on the left side of FIG. 2 is referred. However, the armature windings may be arranged in the order of reverse winding, forward winding and reverse winding, and in the phase order of U phase, V phase and W phase.

Also, the case that the phase order is the U phase, V phase and W phase is described above, but the phase order may be the V phase, W phase and U phase, or W phase, U phase and V phase, W phase, V phase and U phase, V phase, U phase and W phase, or U phase, W phase and V phase.

Embodiment 3

Figure 4:
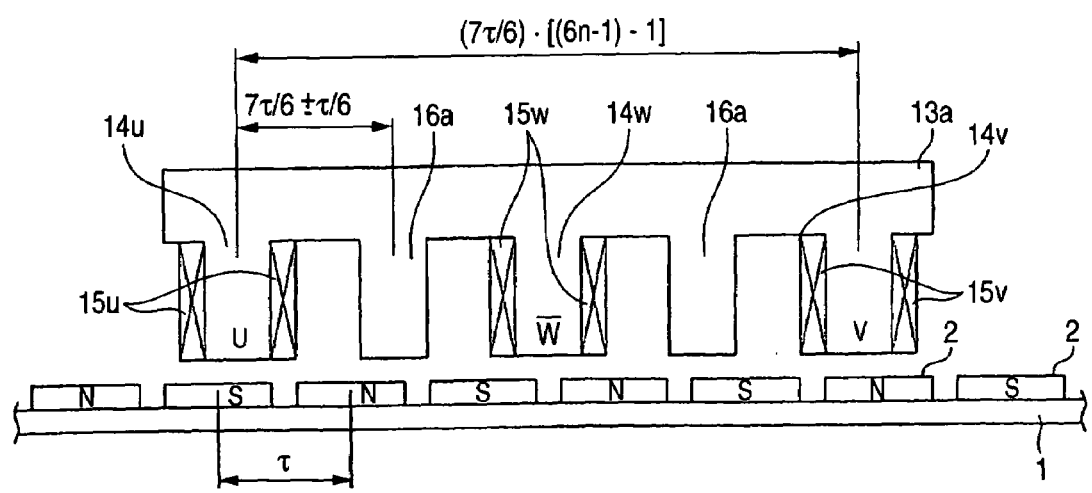
FIG. 4 is a view showing the structure of a linear motor according to an embodiment 3 of the invention.

Referring to FIG. 4, the structure of a linear motor according to an embodiment 3 of this invention will be described below. In FIG. 4, the parts with reference numerals 1 and 2 are the same as in FIG. 1, and not described here. An armature 13a on the needle side is arranged oppositely via a magnetic gap on a magnetic pole face of the field permanent magnets 2 provided on the stator side. The armature 13a consists of an armature core forming the teeth and a yoke portion by punching an electromagnetic steel plate like the comb teeth, coil being wound around a plurality of teeth 14u, 14v and 14w for this armature core to form the armature windings 15u, 15v and 15w.

In FIG. 4, coil is wound around the teeth 14u, 14w and 14v of the armature 13a to form the armature windings 15u, 15w and 15v. The teeth 16a without coil winding is disposed between teeth 14u and 14w and between teeth 14w and 14v. The teeth 14u, 14w and 14v with coil winding and the teeth 16a without coil winding are alternately arranged.

The linear motor according to the embodiment 3 has a combination of the number of magnetic poles in the field magnetic poles with permanent magnets and the number of teeth for the armature as 7n to 6n−1 (n: natural number that is a factor for deciding the number of teeth), in which the interval between teeth for the armature is 7τ/6±τ/6 for the magnetic pole pitch τ of the field magnetic poles, and the armature windings are arranged in the order of forward winding, reverse winding, and forward winding, and in the phase order of U phase, W phase and V phase, for every other teeth from the end teeth on the left side of FIG. 4. Also, a case with n=1 is shown in FIG. 4.

By the way, in the above description, the case that the windings on the primary side are arranged in the order of forward winding, reverse winding, and forward winding, and in the phase order of U phase, W phase and V phase, for every other teeth from the end teeth on the left side of FIG. 4 is referred. However, the armature windings may be arranged in the order of reverse winding, forward winding and reverse winding, and in the phase order of U phase, W phase and V phase.

Also, in the above description, the case that the phase order is the U phase, W phase and V phase is referred, but the phase order may be the W phase, V phase and U phase, V phase, U phase and W phase, V phase, W phase and U phase, W phase, U phase and V phase, or U phase, V phase and W phase.

In the linear motor according to the embodiment 3, the teeth 14u, 4v and 14w with coil winding and the teeth 16a without coil winding are alternately arranged, and among five teeth composing the armature, three teeth have the coil winding, as shown in FIG. 4, whereby the productivity is increased like in the embodiment 1. Also, the coils forming the armature windings 15u, 15v and 15w are disposed via the teeth 16a, and not adjacent with other coils, whereby the phase-to-phase insulation is increased as in the embodiment 1.

Also, when the length of motor is changed to obtain a predetermined thrust, it can be changed for every six teeth in the linear motor according to the embodiment 3. Thereby, the length of motor is easily changed based on the mechanical size.

Embodiment 4

Figure 5:
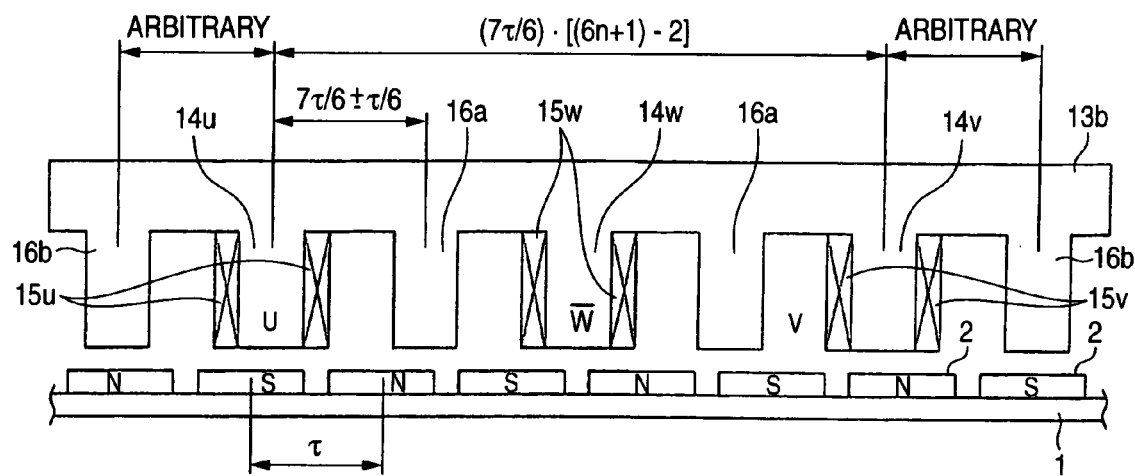
FIG. 5 is a view showing the structure of a linear motor according to an embodiment 4 of the invention.

Referring to FIG. 5, the structure of a linear motor according to an embodiment 4 of this invention will be described below. In FIG. 5, the parts with reference numerals 1, 2, 14u, 14v, 14w, 15u, 15v, 15w and 16a are the same as in FIG. 4, and not described here.

Coil is wound around the teeth 14u, 14v and 14w of the armature 13b to form the armature windings 15u, 15v and 15w. Also, the teeth 16a have no coil winding. The teeth 14u, 14v and 14w with coil winding and the teeth 16a without coil winding are alternately arranged. Among the teeth without coil winding, the teeth 16b are the ones provided at the both sides of the armature 13b, and have any shape and pitch.

The linear motor according to the embodiment 4 has a combination of the number of magnetic poles in the field magnetic poles with permanent magnets and the number of teeth for the armature are 7n to 6n+1 (n: natural number that is a factor for deciding the number of teeth), in which the interval between teeth for the armature except for the teeth 16b on both sides is 7τ/6±τ/6 for the magnetic pole pitch τ of the field magnetic poles, and the armature windings are arranged in the order of forward winding, reverse winding, and forward winding, and in the phase order of U phase, W phase and V phase, for every other teeth beginning with the second teeth (teeth 14u in FIG. 5) from the end teeth 16b on the left side of FIG. 5. Also, a case with n=1 is shown in FIG. 5.

The armature 13b in the linear motor according to the embodiment 4 has a structure in which the teeth 16b without coil winding are added on both sides of the armature 13a in the linear motor according to the embodiment 3.

The same effects as the embodiment 3 are obtained. Since the teeth 16b without coil winding are arranged on both sides of the armature 13b, it is possible to avoid a direct impact on the windings, even when the motor collides at the stroke end while the linear motor is running, whereby the linear motor has a higher reliability.

By the way, in the above description, the case the armature windings are arranged in the order of forward winding, reverse winding, and forward winding, and in the phase order of U phase, W phase and V phase, for every other teeth beginning with the second teeth (teeth 14u in FIG. 5) from the end teeth 16b on the left side of FIG. 5 is referred. However, the armature windings may be arranged in the order of reverse winding, forward winding and reverse winding, and in the phase order of U phase, W phase and V phase.

Also, the case that the phase order is the U phase, W phase and V phase is referred in the above description, but the phase order may be the W phase, V phase and U phase, V phase, U phase and W phase, or V phase, W phase and U phase, W phase, U phase and V phase, or U phase, V phase and W phase.

Embodiment 5

Figure 6:
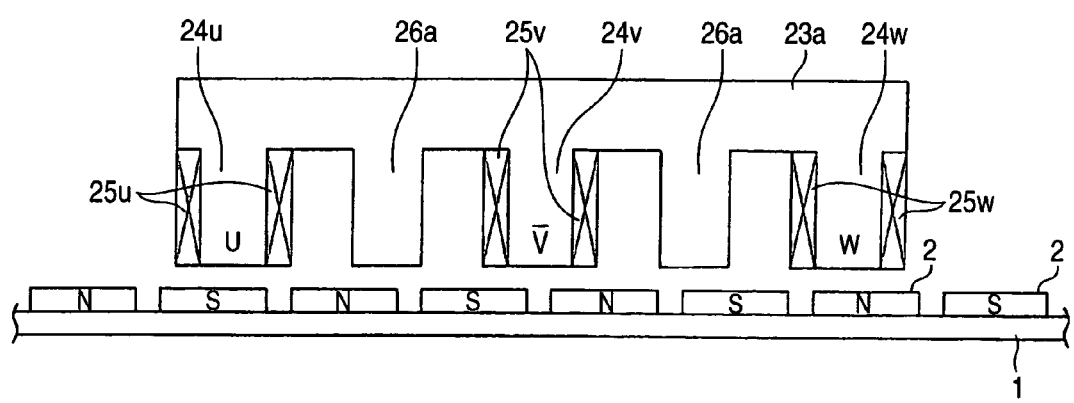
FIG. 6 is a view showing the structure of a linear motor according to an embodiment 5 of the invention.

Referring to FIG. 6, the structure of a linear motor according to an embodiment 5 of this invention will be described below. In FIG. 6, the parts with reference numerals 1 and 2 are the same as in FIG. 1, and not described here.

An armature 23a on the needle side is arranged oppositely via a magnetic gap on a magnetic pole face of the field permanent magnets 2 provided on the stator side. The armature 23a consists of an armature core forming the teeth and a yoke portion by punching an electromagnetic steel plate like the comb teeth, coil being wound around a plurality of teeth 24u, 24v and 24w for this armature core to form the armature windings 25u, 25v and 25w.

In FIG. 6, coil is wound around the teeth 24u, 24v and 24w of the armature 23a to form the armature windings 25u, 25v and 25w. The teeth 26a without coil winding is disposed between teeth 24u and 24v and between teeth 24v and 24w. The teeth 24u, 24v and 24w with coil winding and the teeth 26a without coil winding are alternately arranged.

Assuming that the maximum value of magnetic flux generated by electric current is $\phi$max, and the angular frequency of current is $\omega$, the magnetic flux $\phi1$ interlinking the teeth (6a, 16a or 26a) without coil winding is approximated by the expression (1) (t: time).

$$\phi1 \cong \phi\text{max} \cdot \sin(\omega t) + \phi\text{max} \cdot \sin(\omega t + (\tfrac{1}{3}) \cdot \pi) \quad (1)$$

From the expression (1), the maximum value $|\phi1\text{ max}|$ of magnetic flux $\phi1$ takes places when $\omega t = (\tfrac{1}{3}) \cdot \pi + n\pi$ and $|\phi1\text{max}| = \sqrt{3} \times \phi\text{max}$.

Also, the magnetic flux $\phi2$ interlinking the teeth (4u, 4v, 4w, 14u, 14v, 14w or 24u, 24v, 24w) with coil winding is approximated by the expression (2).

$$\phi2 \cong \phi\text{max} \cdot \sin(\omega t) + \phi\text{max} \cdot \sin(\omega t) \quad (2)$$

From the expression (2), the maximum value $|\phi2\text{max}|$ of magnetic flux $\phi2$ takes places when $\omega t = (\tfrac{1}{2}) \cdot \pi + n\pi$ and $|\phi2\text{max}| = 2 \times 100$ max.

As described above, the magnetic flux $\phi1$ interlinking the teeth without coil winding (6a, 16a or 26a) and the magnetic flux $\phi2$ interlinking the teeth with coil winding (4u, 4v, 4w, 14u, 14v, 14w or 24u, 24v, 24w) are unbalanced, whereby the teeth with coil winding is more likely to have magnetic saturation than the teeth without coil winding.

In the above embodiments 1 to 4, the teeth with coil winding (4u, 4v, 4w or 14u, 14v, 14w) and the teeth without coil winding (6a or 16a) have the same width. However, in the linear motor according to the embodiment 5, the teeth with coil winding (24u, 24v and 24w) is wider than the teeth without coil winding (26a), whereby the magnetic saturation is relieved and the thrust characteristic is improved.

From the above description, the ratio of the maximum value $|\phi1\text{max}|$ of magnetic flux $\phi1$ interlinking the teeth without coil winding to the maximum value $|\phi2\text{max}|$ of magnetic flux $\phi2$ interlinking the teeth with coil winding is 0.866, as obtained from the approximate expressions (1) and (2) that do not consider the magnetic flux of permanent magnets. Actually considering the magnetic flux of permanent magnets, the ratio of the width of the teeth without coil winding to the width of the teeth with coil winding is desirably from 0.5 to 0.9.

Figure 7:
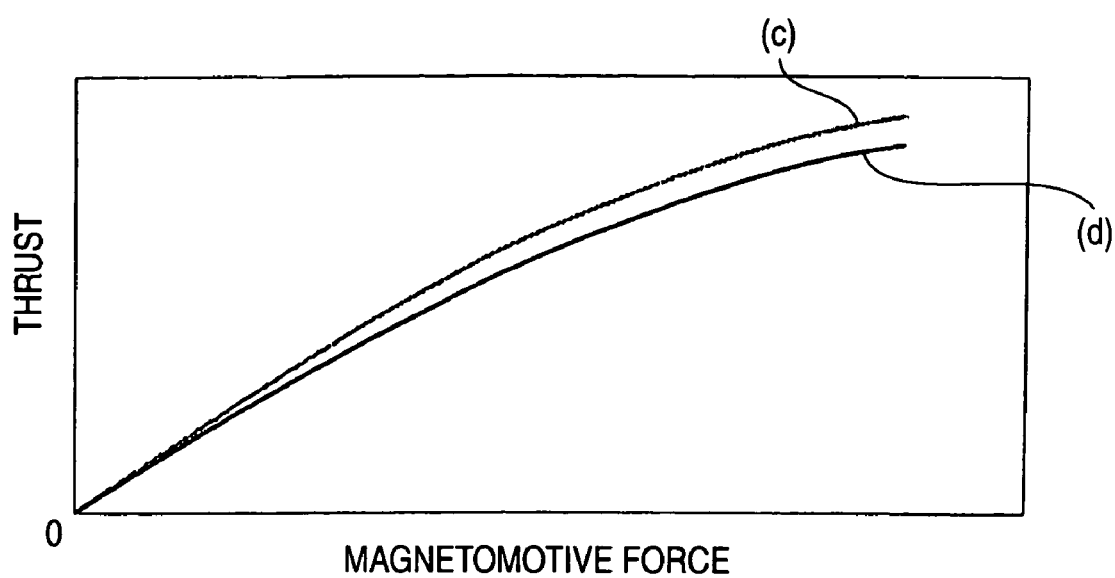
FIG. 7 is a graph showing the thrust characteristics of the linear motor.

Also, by optimizing the ratio of the width of the teeth without coil winding to the width of the teeth with coil winding as shown in FIG. 7, the thrust (FIG. 7C) of the linear motor having the structure as shown in FIG. 6 is greater than the thrust (FIG. 7A) of the linear motor having the structure as shown in FIG. 1, whereby the thrust characteristic is improved.

By the way, in the above description, the armatures 3a, 3b, 13a, 13b and 23a that singly compose the U phase, V phase and W phase are exemplified. However, a predetermined thrust is easily obtained by arranging the armature 3a, 3b, 13a, 13b and 23a as plural armature blocks in the thrust direction.

Also, in the above description, the moving coil type linear motor in which the field magnetic pole is the stator and the armature is the needle is exemplified. However, the same effects are attained by a moving magnet type linear motor in which the field magnetic pole is the needle and the armature is the stator.

INDUSTRIAL APPLICABILITY

As described above, the linear motor of the invention has the suppressed occurrence of cogging thrust and the enhanced insulation of the motor by simple methods, and is suitable for the uses for the actuator or conveying equipment for the table feeder of tooling machine.

The invention claimed is:

1. A linear motor comprising:
   field magnetic poles having permanent magnets arranged at an equal pitch; and
   an armature facing said field magnetic poles and having an armature core;
   wherein the armature core is provided with teeth arranged at an equal pitch and an armature coil with concentrated winding around every other teeth;
   the number of magnetic poles with said permanent magnets and the number of teeth in said armature core are in a combination of 5n to 6n−1 (n: natural number); and
   the interval of teeth in said armature core is $5\tau/6 \pm \tau/6$ for the magnetic pole pitch $\tau$.

2. A linear motor comprising:
   field magnetic poles having permanent magnets arranged at an equal pitch; and
   an armature facing said field magnetic poles and having an armature core;
   wherein, the armature core is provided with teeth arranged at an equal pitch and an armature coil with concentrated winding around every other teeth;
   the number of magnetic poles with said permanent magnets and the number of teeth in said armature core are in a combination of 5n to 6n+1 (n: natural number); and
   the interval of teeth in said armature core is $5\tau/6 \pm \tau/6$ for the magnetic pole pitch $\tau$.

3. A linear motor comprising:
   field magnetic poles having permanent magnets arranged at an equal pitch; and
   an armature facing said field magnetic poles having an armature core;
   wherein the armature core is provided with teeth arranged at an equal pitch and an armature coil with concentrated winding around every other teeth;
   the number of magnetic poles with said permanent magnets and the number of teeth in said armature core are in a combination of 7n to 6n−1 (n: natural number); and
   the interval of teeth in said armature core is $7\tau/6 \pm \tau/6$ for the magnetic pole pitch $\tau$.

4. A linear motor comprising:
   field magnetic poles having permanent magnets arranged at an equal pitch; and
   an armature facing said field magnetic poles and having an armature core;
   wherein the armature core is provided with teeth arranged at an equal pitch and an armature coil with concentrated winding around every other teeth;

the number of magnetic poles with said permanent magnets and the number of teeth in said armature core are in a combination of 7n to 6n+1 (n: natural number); and the interval of teeth in said armature core is $7\tau/6\pm\tau/6$ for the magnetic pole pitch $\tau$.

5. The linear motor according to claim 2, wherein the teeth without armature coil winding located on both sides of said armature is different in the shape and pitch from the other teeth.

6. The linear motor according to claim 1, wherein in the teeth arranged at an equal pitch in said armature core, the teeth without armature coil winding has a smaller width than the teeth with armature coil winding.

7. The linear motor according to claim 4, wherein the teeth without armature coil winding located on both sides of said armature is different in the shape and pitch from the other teeth.

8. The linear motor according to claim 2, wherein in the teeth arranged at an equal pitch in said armature core, the teeth without armature coil winding has a smaller width than the teeth with armature coil winding.

9. The linear motor according to claim 3, wherein the teeth arranged at an equal pitch in said armature core, the teeth without armature coil winding has a smaller width than the teeth with armature coil winding.

10. The linear motor according to claim 4, wherein the teeth arranged at an equal pitch in said armature core, the teeth without armature coil winding has a smaller width than the teeth with armature coil winding.

11. The linear motor according to claim 2, wherein the teeth without armature coil winding located on both sides of said armature is different in the shape and pitch from the other teeth; and the teeth without armature coil winding has a smaller width than the teeth with armature coil winding.

12. The linear motor according to claim 4, wherein the teeth without armature coil winding located on both sides of said armature is different in the shape and pitch from the other teeth; and the teeth without armature coil winding has a smaller width than the teeth with armature coil winding.

* * * * *